(12) United States Patent
Moskowitz

(10) Patent No.: US 7,432,664 B2
(45) Date of Patent: Oct. 7, 2008

(54) CIRCUIT FOR POWERING A HIGH INTENSITY DISCHARGE LAMP

(75) Inventor: Warren Paul Moskowitz, Ipswich, MA (US)

(73) Assignee: Osram Sylvania Inc., Danvers, MA (US)

( * ) Notice: Subject to any disclaimer, the term of this patent is extended or adjusted under 35 U.S.C. 154(b) by 215 days.

(21) Appl. No.: 11/536,948

(22) Filed: Sep. 29, 2006

(65) Prior Publication Data

US 2008/0088250 A1    Apr. 17, 2008

(51) Int. Cl.
*H05B 37/02* (2006.01)
(52) U.S. Cl. .................. 315/224; 315/291; 315/221
(58) Field of Classification Search ......... 315/224–226, 315/219, 221, 291, DIG. 5, DIG. 7; 363/16, 363/123, 131, 132
See application file for complete search history.

(56) References Cited

U.S. PATENT DOCUMENTS

| | | | |
|---|---|---|---|
| 5,642,065 A * | 6/1997 | Choi et al. .................. 327/110 |
| 6,008,591 A | 12/1999 | Huber et al. | |
| 6,362,576 B1 | 3/2002 | Huber et al. | |
| 7,145,293 B2 | 12/2006 | Braun et al. | |
| 2005/0225260 A1 * | 10/2005 | Braun et al. ................ 315/224 |
| 2005/0269963 A1 * | 12/2005 | Komatsu et al. ........ 315/209 R |
| 2006/0113924 A1 * | 6/2006 | Van Casteren .............. 315/242 |

* cited by examiner

*Primary Examiner*—Thuy Vinh Tran
*Assistant Examiner*—Ephrem Alemu
(74) *Attorney, Agent, or Firm*—Carlo S. Bessone

(57) ABSTRACT

A circuit (200) for powering a high intensity discharge lamp (10) comprises first and second input terminals (202,204), first and second output terminal (206,208), first and second inverter switches ($SW_1, SW_2$), a transformer (240), first and second buck capacitors ($C_{BUCK1}, C_{BUCK2}$), first and second low-side capacitors ($C_{LOWSIDE1}, C_{LOWSIDE2}$), an ignitor (216), and a diode subcircuit (250,260). Transformer (240) includes a primary winding (242) and a secondary winding (244). During operation of circuit 200, primary winding (242) functions as a buck inductor, while secondary winding (244) operates in conjunction with diode subcircuit (250,260) to provide enhanced low frequency open circuit voltage (OCV) during the lamp starting phase and during steady-state powering of the lamp (10). Circuit (200) also allows for a lamp current having a non-zero average value. Circuit (200) is realizable with first and second low-side capacitors ($C_{LOWSIDE1}, C_{LOWSIDE2}$) having a relatively low capacitance value.

17 Claims, 2 Drawing Sheets

CIRCUIT FOR POWERING A HIGH INTENSITY DISCHARGE LAMP

FIELD OF THE INVENTION

The present invention relates to the general subject of circuits for powering discharge lamps. More particularly, the present invention relates to a circuit for powering a high intensity discharge lamp.

BACKGROUND OF THE INVENTION

Many of the recent efforts in the design of circuits for powering high intensity discharge (HID) lamps have focused on cost reduction by minimizing parts count. One existing approach along those lines is described in FIG. 1. In circuit 100, the conventional full-bridge inverter is replaced by a half-bridge inverter ($SW_1$,$SW_2$). Circuit 100 includes a pair of low-side capacitors ($C_{LOWSIDE1}$,$C_{LOWSIDE2}$) which functionally replace the two removed inverter transistors. Furthermore, the conventional buck regulator, which normally serves to regulate the power level of the input voltage ($V_{RAIL}$) and thereby regulate the power provided to the lamp, is effectively integrated into circuit 100 (rather than being a separate circuit) by driving the inverter switches ($SW_1$,$SW_2$) with a pulse-width-modulation (PWM) sequence, which allows circuit 100 to control both the polarity and the power level of the excitation that is supplied to the lamp.

Although circuit 100 appears to represent a considerable advance in the art, it is known to have several limitations.

A first limitation of circuit 100 is that, because the maximum voltage (i.e., the so-called "open circuit voltage," or OCV) provided by a conventional half-bridge is, for a given value of input voltage $V_{RAIL}$, only one-half that which is provided by a conventional full-bridge, circuit 100 requires innovative starting methods, such as resonant or quasi-resonant starting, in order to generate an OCV that is sufficiently high to ensure successful starting of the lamp. Those innovative starting method necessarily require high frequency operation.

A second limitation of circuit 100 stems from the fact that the low-side capacitors $C_{LOWSIDE1}$,$C_{LOWSIDE2}$ can only support lamp current flow of a given polarity for a very short time.

As a consequence of both the first and the second aforementioned limitations, circuit 100 does not offer the ability to provide low frequency (e.g., 1 hertz) excitation of the lamp during the starting phase and/or during steady-state powering of the lamp. Some prior designs have shown exemplary performance using a low frequency (e.g., 1 hertz or so) square wave excitation during the starting phase in order to expedite the heating of the lamp electrodes while minimizing possible sputtering and/or loss of lamp conduction. It is believed that, during the starting phase, use of a low frequency or direct current (DC) excitation is to be preferred over use of a high frequency excitation. The reason for this is that commutation (i.e., reversal) of lamp polarity is a troublesome event until both of the lamp electrodes have become hot enough to be effective thermionic emitters, so fewer commutations (i.e., low frequency excitation) during the starting phase is better.

A third limitation of circuit 100 is that it is limited to operating such that the lamp current has a zero average value (i.e., no DC component). For some applications, such as for asymmetric (e.g., vertically oriented) lamps operated at constant power, it is desirable to provide a lamp current having a non-zero average (i.e., DC) value. Circuit 100 is not capable of providing that type of operation.

A fourth limitation of circuit 100 is that the low-side capacitors $C_{LOWSIDE1}$,$C_{LOWSIDE2}$ require relatively large value (e.g., 68 microfarads) electrolytic capacitors; such capacitors are costly, large, and prone to reliability problems (especially in the high temperature operating environment that is typically encountered within HID ballasts). An additional negative consequence of large value low-side capacitors is a large inrush current that occurs when AC power is initially applied to the circuit. The series combination of $C_{LOWSIDE1}$,$C_{LOWSIDE2}$ typically serves a second function as the so-called bulk capacitors for the front-end circuitry (e.g., a combination of a full-wave rectifier circuit and a power factor correcting DC-to-DC converter, such as boost converter or a buck converter) that provides $V_{RAIL}$. Upon application of AC power to the circuit, the typical front-end circuitry causes the bulk capacitor(s) to rapidly charge to the peak value of the voltage supplied by the AC power source. This rapid charging results in a potentially large inrush current (which is especially large when AC power is initially applied while the instantaneous value of the voltage of the AC power source is at or near its peak value). Large inrush currents are generally acknowledged to be quite undesirable, and are responsible for a host of difficulties (e.g., problems with wiring, component failures, non-compliance with regulations, need for additional circuitry to limit the inrush current, etc.).

Thus, a need exists for a circuit that preserves many of the advantages of circuit 100, but that also provides for low frequency excitation of the lamp during the starting phase and during steady-state powering of the lamp. A further need exists for a circuit that offers the ability to power the lamp with a non-zero average current. A further need exists for a circuit in which the low-side capacitors can be realized in a more cost-effective and space-efficient manner while enhancing the long-term reliability, and substantially reducing the peak inrush current, of the circuit. A circuit with these attributes would represent a considerable advance over the prior art.

DETAILED DESCRIPTION OF THE PREFERRED EMBODIMENTS

Figure 1:
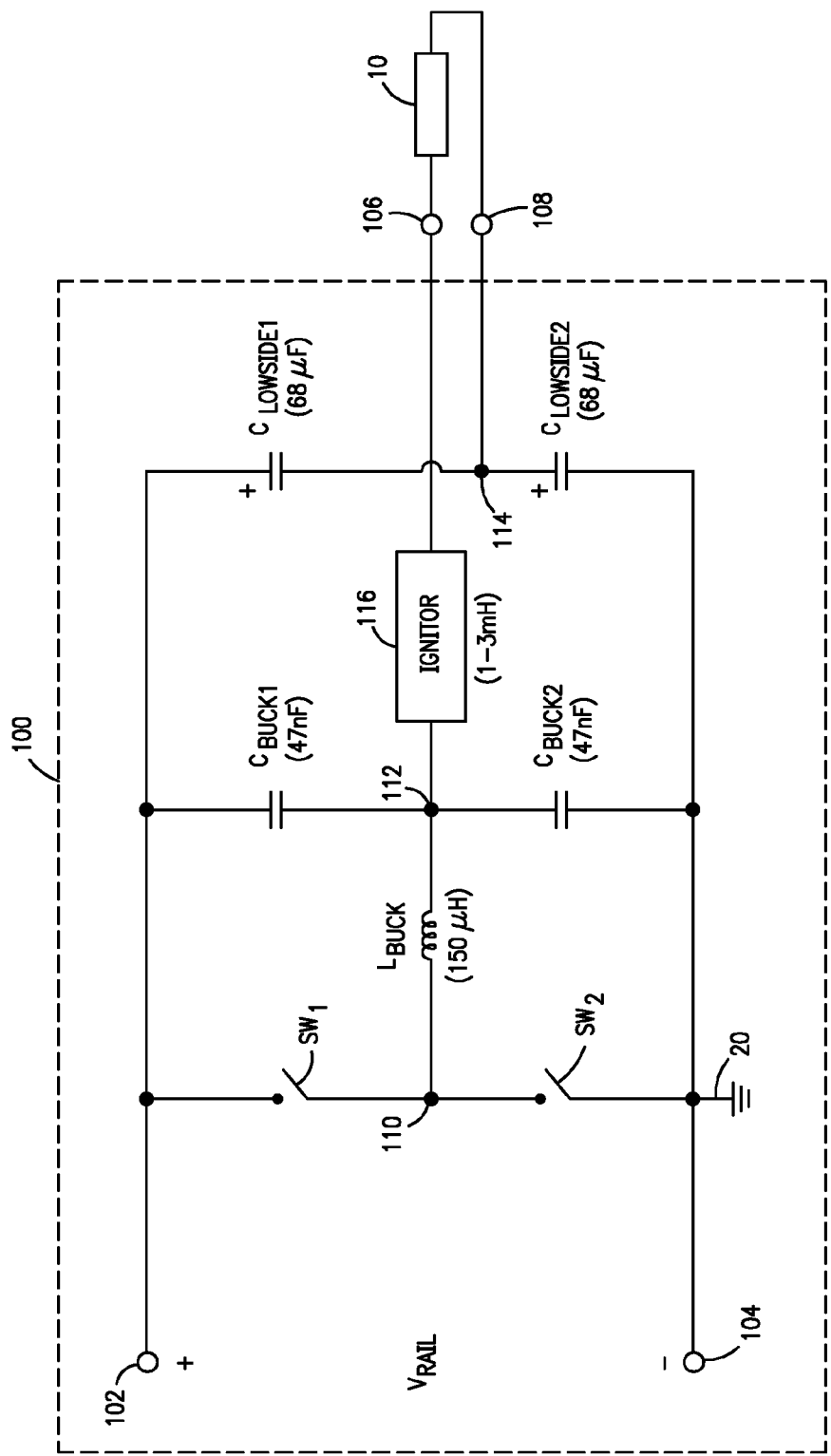
FIG. 1 is an electrical diagram of a circuit for powering an HID lamp, in accordance with the prior art.
Figure 2:
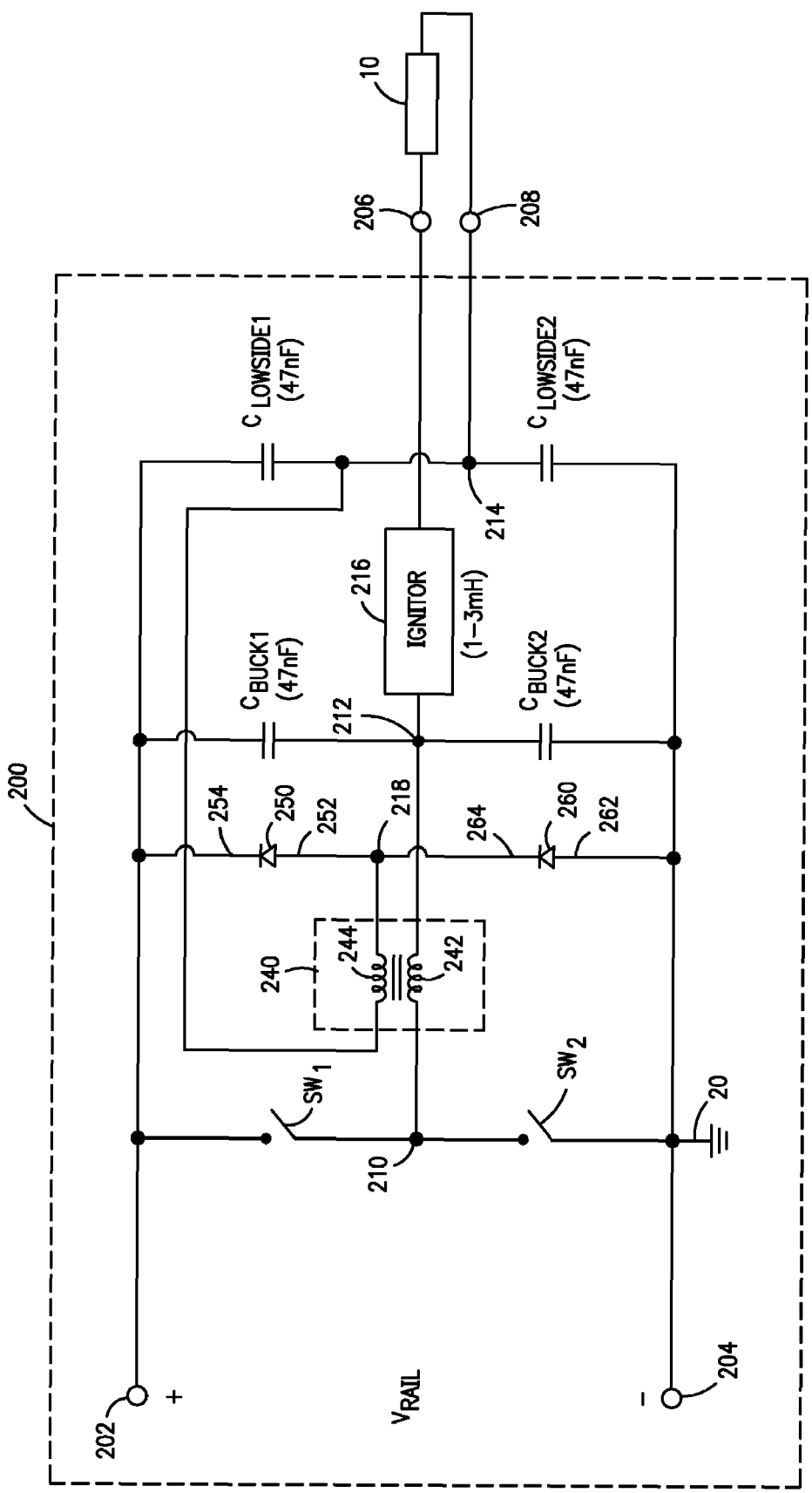
FIG. 2 is an electrical diagram of a circuit for powering an HID lamp, in accordance with a preferred embodiment of the present invention.

FIG. 2 describes a circuit 200 for powering a high intensity discharge (HID) lamp 10. Circuit 200 includes first and second input terminals 202,204, first and second output terminals 206,208, first and second inverter switches $SW_1$,$SW_2$, first and second buck capacitors $C_{BUCK1}$,$C_{BUCK2}$, first and second low-side capacitors $C_{LOWSIDE1}$,$C_{LOWSIDE2}$, a buck inductor (also referred to as a primary winding 242 of transformer 240) having a primary winding 242, and an ignitor 216. Additionally, and in distinction over the prior art circuit 100 described in FIG. 1, circuit 200 further includes a diode subcircuit (i.e., first and second diodes 250,260) and a secondary winding 244 of transformer 240. As will be described in further detail herein, the added presence of diodes 250,260 and secondary winding 244 provides circuit 200 with a number of significant operational advantages and cost benefits in comparison with prior art circuit 100.

Further details regarding the preferred structure and operation of circuit 200 are now described with reference to FIG. 2 as follows.

First and second input terminals 202,204 are intended to receive a source of substantially direct current (DC) rail voltage $V_{RAIL}$, such as that which is typically provided by suitable rectification and/or DC-to-DC converter circuitry. Typically, $V_{RAIL}$ is selected to have a magnitude that is on the order of several hundred volts (e.g., 360 volts is one commonly chosen value). First and second output terminals 206,208 are intended for coupling to HID lamp 10.

As described in FIG. 2, first and second inverter switches $SW_1,SW_2$ are coupled in a half-bridge configuration. More specifically, first inverter switch $SW_1$ is coupled between first input terminal 202 and a first node 210, while second inverter switch $SW_2$ is coupled between first node 210 and circuit ground 20; circuit ground 20 is coupled to second input terminal 204. Inverter switches $SW_1,SW_2$ are typically realized by suitable power transistors (i.e., either bipolar junction transistors or field-effect transistors), and are driven (i.e., turned on and off in a controlled manner) by a suitable driver circuit (not shown or described herein).

First buck capacitor $C_{BUCK1}$ is coupled between first input terminal 202 and a second node 212. Second buck capacitor $C_{BUCK2}$ is coupled between second node 212 and circuit ground 20. First low-side capacitor $C_{LOWSIDE1}$ is coupled between first input terminal 202 and a third node 214 (third node 214 is coupled to second output terminal 208). Second low-side capacitor $C_{LOWSIDE2}$ is coupled between third node 214 and circuit ground 20.

In a preferred embodiment, $C_{LOWSIDE1}$ and $C_{LOWSIDE2}$ each have a first capacitance, $C_{BUCK1}$ and $C_{BUCK2}$ each have a second capacitance, and the first capacitance and the second capacitance are on the same order of magnitude. In one embodiment, the first capacitance and the second capacitance are about equal. For instance, FIG. 1 notes (parenthetically, below the reference designators for each capacitor) preferred values of 47 nanofarads for each of $C_{BUCK1}$, $C_{BUCK2}$, $C_{LOWSIDE1}$, and $C_{LOWSIDE2}$.

Significantly, $C_{LOWSIDE1}$ and $C_{LOWSIDE2}$ in circuit 200 are realized by a capacitance (e.g., 47 nanofarads) that is at least several orders of magnitude less than the capacitance (e.g., 68 microfarads) that is typically required for realizing $C_{LOWSIDE1}$ and $C_{LOWSIDE2}$ in circuit 100; the operational attributes of circuit 200 which make this possible will be explained in further detail herein. In any event, it will be appreciated by those skilled in the art that the much smaller required capacitance for $C_{LOWSIDE1}$ and $C_{LOWSIDE2}$ results in substantial benefits (as to the material cost, physical size, long-term reliability, and temperature tolerance) to circuit 200 in comparison with prior art circuit 100. More specifically, in circuit 100, $C_{LOWSIDE1}$ and $C_{LOWSIDE2}$ require electrolytic capacitors (e.g., 68 microfarads), which are costly, physically large, prone to reliability problems (which are further aggravated by operation in the relatively high temperature conditions that are common in ballasts for HID lamps), and which cause high inrush currents; in circuit 200, by contrast, $C_{LOWSIDE1}$ and $C_{LOWSIDE2}$ may be realized by film type capacitors (e.g., 47 nanofarads), which are less costly, physically smaller, and much less prone to reliability problems than the electrolytic capacitors required by prior art circuit 100. Moreover, realization of $C_{LOWSIDE1}$ and $C_{LOWSIDE2}$ by capacitors having a relatively low value (e.g., 47 nanofarads) provides the added benefit of dramatically reducing the peak inrush currents which are encountered upon initial application of AC power.

Ignitor 216, which may be realized by any of a number of suitable ignitor arrangements that are well known to those skilled in the art, is coupled between second node 212 and first output terminal 206. During operation of circuit 200, ignitor 216 generates an appropriately high voltage (e.g., on the order of several thousand volts or so) between first and second output terminals 206,208 for igniting HID lamp 10.

The diode subcircuit is coupled between first and second input terminals 202,204, and is preferably realized by a series combination of a first diode 250 and a second diode 260. First diode 250 has an anode 252 coupled to a fourth node 218, and a cathode 254 coupled to first input terminal 202. Second diode 260 has an anode 262 coupled to circuit ground 20, and a cathode coupled to fourth node 218.

Within transformer 240, secondary winding 244 is magnetically coupled to buck inductor (i.e., primary winding) 242. Secondary winding 244 is electrically coupled between the diode subcircuit (i.e., to diodes 250,260 via fourth node 218) and third node 214.

During operation of circuit 200, the effect of the added presence of diodes 250,260 and secondary winding 244 is to control the voltage at second output terminal 208 (also referred to as the "lamp low" or "LL" terminal) in such a way that it equals $V_{RAIL}$-$V_{BUCK}$ (where $V_{BUCK}$ is defined as the voltage at second node 212) when primary winding 242 and secondary winding 244 have an equal number of wire turns. Consequently, circuit 200 essentially behaves like a full-bridge arrangement (which requires four inverter switches), but without the need for two additional inverter switches, the more extensive/complex circuitry required for driving a full-bridge, etc.

Circuit 200 provides two significant operational advantages over circuit 100: (1) the ability to start and/or operate the lamp using low frequency waveforms; and (2) the ability to operate the lamp with non-zero average current.

It should be appreciated that, unlike prior art circuit 100, circuit 200 generates an "open circuit voltage" (OCV) that is comparable to that which is provided by a full-bridge arrangement (which provides twice the OCV of a conventional half-bridge arrangement). Thus, unlike circuit 100, circuit 200 does not need to rely upon high frequency resonant or quasi-resonant operation (i.e., high frequency switching of the inverter switches at or near the natural resonant frequency, or some fraction thereof, of the buck inductor and the buck capacitors) in order to generate sufficient "open circuit voltage" (OCV) to ensure successful startup of the lamp.

It should further be appreciated that, in prior art circuit 100, the low-side capacitors can only support lamp current flow of a given polarity for a very short time (which is largely dictated by the capacitance value of the low-side capacitors) without significant change in the potential of the lamp low or LL terminal (node 114) beyond the point where proper lamp operation can be maintained. Consequently, prior art circuit 100 is incapable of supporting low frequency excitation of the lamp, and is further limited to operating the lamp with zero average current. In circuit 200, by contrast, the potential of the lamp low or LL terminal (node 214) is actively controlled by the circuit. Therefore, unlike prior art circuit 100, circuit 200 is capable of appropriately driving the lamp during the starting phase by using low frequency excitation (which is believed to benefit the lamp starting process and, hence, the useful operating life of the lamp). Moreover, circuit 200 allows for steady-state powering of the lamp using low frequency excitation, and also accommodates [when it is desirable, such as for asymmetric (e.g., vertically oriented) lamps operated at constant power] steady-state powering of the lamp with non-zero average current.

In prior art circuit 100, it has been observed that the voltage at the "lamp low" terminal 108 changes inversely with the capacitance of $C_{LOWSIDE1}$ and $C_{LOWSIDE2}$. By contrast, in circuit 200, the voltage at "lamp low" terminal 208 is primarily controlled by operation of the inverter (i.e., such that it equals $V_{RAIL}$-$V_{BUCK}$, as previously described) and is thus substantially unaffected by the capacitance of $C_{LOWSIDE1}$ and $C_{LOWSIDE2}$. Consequently (as previously discussed), $C_{LOWSIDE1}$ and $C_{LOWSIDE2}$ in circuit 200 may be realized with a much smaller capacitance than what is required for circuit 100, which provides significant advantages in terms of material cost, size, reliability, and peak inrush current.

In one embodiment, primary winding 242 and secondary winding 244 are loosely coupled. Loose coupling, also referred to as imperfect magnetic coupling, has the effect of adding so-called leakage inductance (which essentially behaves as an added inductance in series with primary winding 242) that is useful for filtering (reducing) the ripple that is present in the voltage at "lamp low" terminal 208.

In another embodiment, primary winding 242 and secondary winding 244 have an unequal number of wire turns. It is contemplated that it may be desirable to have unequal numbers of turns on primary and second windings 242,244 so as to increase or decrease the magnitude of the voltage excursions at "lamp low" terminal 208 relative to those at node 212 (at which the voltage is equal to $V_{BUCK}$).

Although the present invention has been described with reference to certain preferred embodiments, numerous modifications and variations can be made by those skilled in the art without departing from the novel spirit and scope of this invention.

What is claimed is:

1. A circuit for powering a high intensity discharge (HID) lamp, the circuit comprising:
    first and second input terminals for receiving a source of substantially direct current (DC) voltage;
    first and second output terminals adapted for coupling to an HID lamp;
    a first inverter switch coupled between the first input terminal and a first node;
    a second inverter switch coupled between the first node and circuit ground, wherein circuit ground is coupled to the second input terminal;
    a buck inductor coupled between the first node and a second node;
    a first buck capacitor coupled between the first input terminal and the second node;
    a second buck capacitor coupled between the second node and circuit ground;
    a first low-side capacitor coupled between the first input terminal and a third node, wherein the third node is coupled to the second output terminal;
    a second low-side capacitor coupled between the third node and circuit ground;
    an ignitor coupled between the second node and the first output terminal; and
    wherein the circuit is characterized by further comprising:
        a diode subcircuit coupled between the first and second input terminals; and
        a secondary winding that is magnetically coupled to the buck inductor, wherein the secondary winding is coupled between the diode subcircuit and the third node.

2. The circuit of claim 1, wherein the diode subcircuit comprises a series combination of two diodes.

3. The circuit of claim 1, wherein the diode subcircuit comprises:
    a first diode having an anode coupled to a fourth node and a cathode coupled to the first input terminal; and
    a second diode having an anode coupled to circuit ground and a cathode coupled to the fourth node.

4. The circuit of claim 3, wherein the secondary winding is coupled to the diode subcircuit at the fourth node.

5. The circuit of claim 1, wherein the first and second low-side capacitors each have a capacitance that is at least several orders of magnitude less than about 68 microfarads.

6. The circuit of claim 1, wherein:
    the first and second low-side capacitors each have a first capacitance;
    the first and second buck capacitors each have a second capacitance; and
    the first capacitance and the second capacitance are on the same order of magnitude.

7. The circuit of claim 6, wherein the first and second capacitances are about equal.

8. The circuit of claim 1, wherein the first and second low-side capacitors each have a capacitance that is on the order of about 47 nanofarads.

9. The circuit of claim 1, wherein the buck inductor and the secondary winding are loosely coupled.

10. The circuit of claim 1, wherein the buck inductor and the secondary winding have an unequal number of wire turns.

11. A circuit for powering a high intensity discharge (HID) lamp, the circuit comprising:
    first and second input terminals (202,204) for receiving a source of substantially direct current (DC) voltage ($V_{RAIL}$);
    first and second output terminals (206,208) adapted for coupling to an HID lamp (10);
    a first inverter switch ($SW_1$) coupled between the first input terminal (202) and a first node (210);
    a second inverter switch ($SW_2$) coupled between the first node (210) and circuit ground (20), wherein circuit ground (20) is coupled to the second input terminal (204);
    a first buck capacitor ($C_{BUCK1}$) coupled between the first input terminal (202) and a second node (212);
    a second buck capacitor ($C_{BUCK2}$) coupled between the second node (212) and circuit ground (20);
    a first low-side capacitor ($C_{LOWSIDE1}$) coupled between the first input terminal (202) and a third node (214), wherein the third node (214) is coupled to the second output terminal (208);
    a second low-side capacitor ($C_{LOWSIDE2}$) coupled between the third node (214) and circuit ground (20);
    an ignitor (216) coupled between the second node (212) and the first output terminal (206);
    a first diode (250) having an anode (252) coupled to a fourth node (218) and a cathode (254) coupled to the first input terminal (202);
    a second diode (260) having an anode (262) coupled to circuit ground (20) and a cathode (264) coupled to the fourth node (218);
    a transformer (240), comprising:
        a primary winding (242) coupled between the first node (210) and the second node (212); and
        a secondary winding (244) coupled between the fourth node (218) and the third node (214).

12. The circuit of claim 11, wherein the first and second low-side capacitors ($C_{LOWSIDE1}$, $C_{LOWSIDE2}$) each have a capacitance that is at least several orders of magnitude less than about 68 microfarads.

13. The circuit of claim 12, wherein the capacitance of the first and second low-side capacitors ($C_{LOWSIDE1}$, $C_{LOWSIDE2}$) is on the order of about 47 nanofarads.

14. The circuit of claim 11, wherein:
the first and second low-side capacitors ($C_{LOWSIDE1}$, $C_{LOWSIDE2}$) each have a first capacitance;
the first and second buck capacitors ($C_{BUCK1}$, $C_{BUCK2}$) each have a second capacitance; and
the first capacitance and the second capacitance are on the same order of magnitude.

15. The circuit of claim 14, wherein the first and second capacitances are about equal.

16. The circuit of claim 15, wherein the primary and secondary windings (242,244) of the transformer (240) are loosely coupled.

17. The circuit of claim 15, wherein the primary and secondary windings (242,244) of the transformer (240) have an unequal number of wire turns.

* * * * *